Aug. 27, 1968         A. ROHDE ET AL         3,399,004
           ANTIFRICTION BEARING WITH CYLINDRICAL ROLLERS
Filed July 22, 1966                    2 Sheets-Sheet 1

Inventors
ANDREAS ROHDE
KARL-ALBERT ECKSTEIN
GÜNTHER SCHUMANN
BY
Hammond Little
ATTORNEYS

3,399,004
ANTIFRICTION BEARING WITH CYLINDRICAL ROLLERS
Andreas Rohde, Ulm-Grimmelfingen, Karl-Albert Eckstein, Herzogenaurach, and Gunther Schumann, Nurnberg, Germany, assignors to Industriewerk Schaeffler OHG, Herzogenaurach, Germany, a corporation of Germany
Filed July 22, 1966, Ser. No. 567,300
Claims priority, application Germany, Sept. 10, 1965, J 28,968
11 Claims. (Cl. 308—35)

ABSTRACT OF THE DISCLOSURE

An antifriction bearing comprised of a drawn outer race, cylindrical rollers disposed thereon and a separately made base against which a shaft can abut to receive axial forces, the said base being thicker than the race to accommodate axial forces and being securely fixed in the outer race.

---

The invention relates to an antifriction bearing with cylindrical rollers, particularly needle bearings, having an outer race formed without machining and sealed at one end with a base.

*Prior art*

Numerous possibilities have already been suggested for the arrangement of shaft ends or lugs, which have to accommodate the axial forces with the aid of bushings, particularly needle bearing bushings, which frequently are drawn in one single piece from sheet metal. However, it was not always possible to reenforce the bottom of the bushing to a sufficient degree to withstand any stress which occurred, and to have a sufficiently small elastic distortion. Of course, bushings which are machined to construct the base of the bushing in proportion to thickness desired are known, but the cost for the construction of those bushings is very high. It is sometimes possible to draw the bushings as a whole from heavier sheet metal to give an ample firmness to the base of the bushing, but this naturally makes the outer race of the busing correspondingly thicker, which has the considerable disadvantage that all of the installation measurements for the seating of the shaft, compared with former methods, have to be changed.

*Objects of the invention*

It is an object of the invention to provide antifriction bearings with cylindrical rollers and an outer race formed without machining, and provided with a base against which the shaft can abut for accommodation of axial forces.

This and other objects and advantages of the invention will become obvious from the following detailed descriptions.

*The invention*

The antifriction bearings of this invention are comprised of an outer race formed without machining, cylindrical rollers, preferably needle bearings, disposed on the outer race, and a separately-constructed base against which a shaft can abut to receive axial forces, the said base having a greater thickness than the outer race and being securely attached to the end of the outer race.

The base is manufactured separately, has a greater thickness than the outer race, and is securely connected by means of the outer race to a bushing. While the outer race retains the same thickness as in needle bushings of the conventional, drawn-out type, it is now possible to install bases of variable thicknesses for different kinds of stresses. These bushings are used mainly for the arrangement of articulated transverse lugs. Since the bases can be adjusted to different stresses while the outer race retains the same thickness as in the conventional, drawn needle bushings, significant savings will result, especially in mass production, of bushings drawn in one piece for various types of stresses.

The invention has another advantage in that the base of the needle bushing can be shaped as a flat, round disc, which has the advantage of a particularly simple and consequently economical manufacture, such as stamping out the disc.

Another modification of the present invention is that the base may be a round disc, which is slightly conical or arcuated toward the interior of the bearing. The slightly conical or arcuated base is flattened, by the axial pressure of an abutting shaft, which increases the diameter of the base. Consequently, the bushing is braced in the bore to provide a very satisfactory contact. Under certain circumstances, it is even possible to omit the previously necessary fastening means, which served for the support of the bushing in the bore.

The construction of the needle bushing is carried out in such a manner, that the separately produced base is either embedded in or joined to the outer race and is securely connected with the base by the plastic shaping of parts of the outer race or of the base. Various possibilities to attach the separately manufactured base to the outer race by plastic shaping of parts of the outer race or of the base can be used.

The inner diameter of the outer race may be enlarged at one end to accommodate the base which is larger in diameter than the inner diameter of the outer race, or the diameter of the base may correspond to the inner diameter of the outer race. The base is disposed in the outer race and then the end of the outer race axially projecting from the installed base is turned inwardly to secure the base. When the diameter of the base corresponds with the inner diameter of the outer race, a conforming device should act from the outside during the insertion of the base in the outer race to guarantee an accurate straight insertion of the base.

Another means of connecting the separately machined base with the outer race consists in providing the outer race at one end with a slightly radially inwardly directed flange, against which the slightly conical or arcuated base abuts from within, its diameter corresponding with the inner diameter of the outer race, and then the base is subjected to axial pressure until it abuts against the race bore.

Another means of connecting the base and the outer race comprises turning the end of the outer race axially projecting over the inserted base inwardly so that it forms an acute angle with the base and contacts the base only at its outermost rim area. When the flange resulting from turning over of the axially projecting end is braced only at the outermost edge of the base and forms together with the base an acute angle, the advantage is that the flange does not need to accommodate the fixed deflection of the base, which occurs due to the abutment of the shaft against the base. The flange is therefore not stressed and a breaking off of the flange is out of the question.

Another means of connecting the base and the outer race comprises expanding one end of the outer race for the accommodation of the base, which has a larger diameter than the inner diameter of the outer race, placing the base, and then drawing the outer race through a matrix, so that the outer race is returned to its original cylindrical form, with the expanded end folding over the rim of the inserted base. The expanded end of the outer race can be provided, if desired, with an annular groove to facilitate the disposal or the insertion of the base. For this purpose, it is advisable to have the surface of the base conical in form which further reenforces the connection.

In all of these types of connections, the base can be inserted either in the outer race while still pliable, and, after connection with the outer race, it can be hardened together with the outer race, or the base in already hardened condition, may be connected with the hardened outer race. Of course, the flange to be turned over must remain unhardened in the latter instance.

To protect the bushing against possible leakage of lubricants, the seam between the outer race and the base can be sealed with lacquer, synthetic adhesives or the like. In all of these types of connections described, the base can be shaped either as a flat disc, slightly conical or arcuate toward the interior of the bearing.

Referring now to the drawings.

Figure 1:
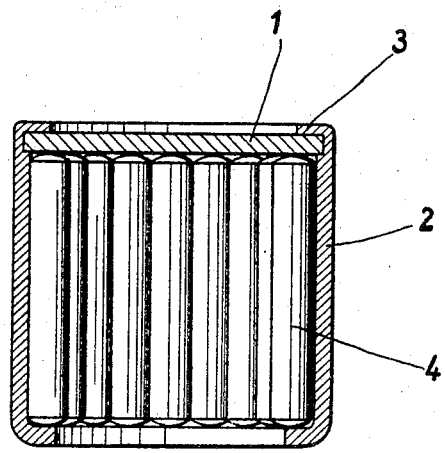
FIG. 1 is a cross-sectional view of a complete needle bearing bushing of the invention.

In FIG. 1, it can be seen that the base 1 of the bushing is a flat round disc, and the inner diameter of the outer race 2 has been enlarged at one of its ends so that the base 1, which has a larger diameter than the inner diameter of the race, can be inserted. The axially projecting end 3 of the outer race 2 is bent over so that it abuts against the base 1. The needles 4 roll on the outer race 2.

Figure 2:
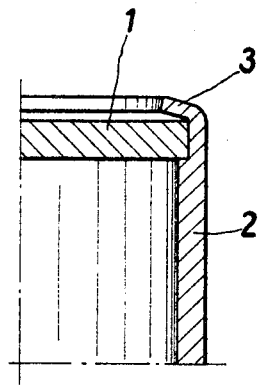
FIGS. 2 to 7 are partial cross-sectional views of various means of connecting the base and the outer race.

In the embodiment of FIG. 2, the axially projecting end 3 after being bent over, forms an acute angle with the base, whereby it touches the base only at its outermost rim area. This prevents the turned over end 3 of the outer race 2 from having to accommodate the deflection of the base 1, which results from the constant abutting of a shaft and the flange 3 is, therefore, not stressed, and will not break off.

Figure 3:
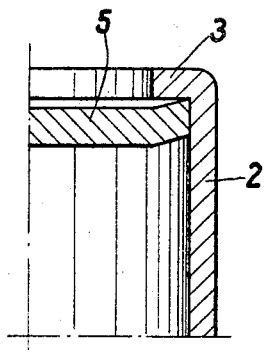

FIG. 3 illustrates an embodiment in which a slightly conical base 5 was employed. The projecting end 3 of the outer race 2 after being turned over, extends radially inwardly and also forms an acute angle with the base, touching the base only at its outermost edge. The inner diameter of the outer race 2 did not have to be enlarged for the insertion of the base 5.

Figure 4:
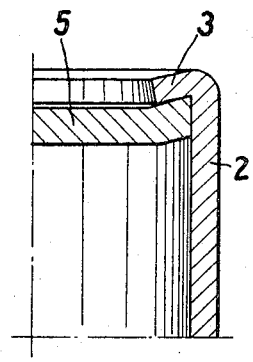

The embodiment of FIG. 4 differs from that of FIG. 3 only in that the axially projecting end 3 of the outer race 2 is not directed radially inwardly after the bending, but forms with the base an acute angle, again touching the base only at its outermost edge. The embodiments of FIGS. 3 and 4 offer two different possibilities for the insertion of the base 5 in the outer race 2. In the first case the flange 3 is bent over after the base 5 has been inserted. In the second case the flange 3 is produced in one piece together with the outer race 2, and the base 5 abuts from within against the flange 3 and is then deformed by axial pressure until it rigidly abuts against the outer race bore.

Figure 5:
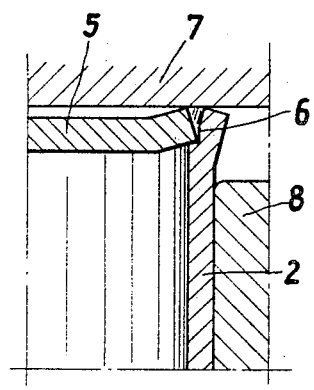
Figure 6:
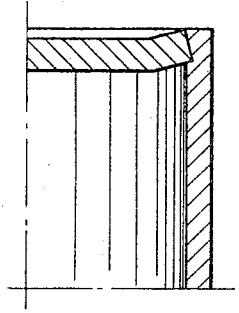

FIGS. 5 and 6 illustrate an embodiment where first, the outer race 2 is conically enlarged at one end and the outer race 2 is provided with a groove 6 at the expansion point to facilitate the insertion of the base 5 as shown in FIG. 5. To attain the final shape of the bushing as illustrated in FIG. 6, the outer race 2 is subjected to plastic distortion around the edge of the base 5 with the aid of a piston 7 and of a matrix 8.

Figure 7:
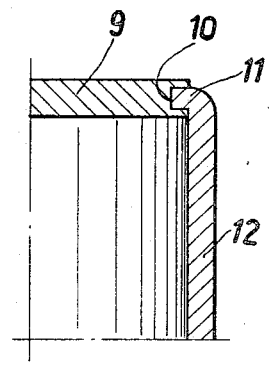

FIG. 7 shows an example of construction, where the base 9 is provided with an annular groove 10, into which one end 11 of the outer race 12 is fitted under plastic distortion.

Various modifications of the bushing of the invention may be made without departing from the spirit or scope thereof and it is to be understood that the invention is to be limited only as defined in the appended claims.

We claim:

1. An antifriction bearing comprised of an outer race formed by drawing from sheet metal, cylindrical rollers disposed on the outer race, and a separately constructed base against which a shaft can abut to receive axial forces, the said base having a greater thickness than the outer race and being securely attached to the end of the outer race.

2. A bearing of claim 1 wherein the base is a flat, round, disc.

3. A bearing of claim 1 wherein the base is a round disc with a slightly conical or arcuate shape toward the interior of the bearing.

4. A bearing of claim 1 wherein the inner diameter of the outer race is reduced at one end to accommodate the base which has a diameter larger than the inner diameter of the outer race and the ends of the outer race extending beyond the base are bent inwardly to secure the base.

5. A bearing of claim 1 wherein the diameter of the base is the same as the inner diameter of the outer race and the base is in the outer race and the ends of the outer race extending beyond the base are bent inwardly to secure the base.

6. A bearing of claim 3 wherein the diameter of the base is the same as the inner diameter of the inner race and the base is straightened within the outer race to rigidly connect the same with the bore of the outer race and the ends of the outer race extending beyond the base are bent to form a nearly radially inwardly directed flange.

7. A bearing of claim 6 wherein the said flange forms an acute angle with the base whereby the flange touches the base only at its outermost edge.

8. A bearing of claim 1 wherein the base is provided with a groove about its periphery into which the end of the outer race is fitted.

9. A bearing of claim 3 in which the base with a diameter larger than the inner diameter of the outer race was disposed in the outer race with an expanded end which was returned to its original shape.

10. A bearing of claim 1 in which the connection between the base and the outer race is sealed.

11. A bearing of claim 1 wherein the assembled bearing is hardened.

References Cited

UNITED STATES PATENTS

| 2,676,074 | 4/1954 | Nusbaum | 308—212 |
| 3,062,026 | 1/1962 | Pitner. | |
| 2,270,281 | 1/1942 | Dunn. | |

FOREIGN PATENTS 602,846  3/1960  Italy.

MARTIN P. SCHWADRON, *Primary Examiner.*

FRANK SUSKO, *Examiner.*